(12) United States Patent
Miyahara et al.

(10) Patent No.: US 9,745,642 B2
(45) Date of Patent: Aug. 29, 2017

(54) METHOD FOR HEAT TREATING A METAL TUBE OR PIPE, METAL TUBE OR PIPE, AND HEAT TREATMENT FURNACE

(71) Applicant: NIPPON STEEL & SUMITOMO METAL CORPORATION, Tokyo (JP)

(72) Inventors: Osamu Miyahara, Tokyo (JP); Toshihiro Imoto, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 307 days.

(21) Appl. No.: 14/385,830

(22) PCT Filed: Mar. 8, 2013

(86) PCT No.: PCT/JP2013/001479
§ 371 (c)(1),
(2) Date: Sep. 17, 2014

(87) PCT Pub. No.: WO2013/145583
PCT Pub. Date: Oct. 3, 2013

(65) Prior Publication Data
US 2015/0047735 A1    Feb. 19, 2015

(30) Foreign Application Priority Data

Mar. 26, 2012   (JP) ................. 2012-069723

(51) Int. Cl.
*F27D 5/00* (2006.01)
*C21D 9/08* (2006.01)
(Continued)

(52) U.S. Cl.
CPC ............... *C21D 9/08* (2013.01); *C21D 8/10* (2013.01); *C21D 8/105* (2013.01); *C21D 9/0025* (2013.01);
(Continued)

(58) Field of Classification Search
CPC ............ C21D 9/08; C21D 9/0025; F27D 5/00
(Continued)

(56) References Cited

U.S. PATENT DOCUMENTS

| | | | | |
|---|---|---|---|---|
| 5,848,890 | A * | 12/1998 | McCormick | F27D 5/00 432/122 |
| 2012/0285577 | A1* | 11/2012 | Kinomura | C21D 9/08 138/177 |
| 2015/0047735 | A1* | 2/2015 | Miyahara | C22C 38/40 138/177 |

FOREIGN PATENT DOCUMENTS

| | | |
|---|---|---|
| JP | 58-7859 | 1/1983 |
| JP | 60-362 | 1/1985 |

(Continued)

*Primary Examiner* — Scott Kastler
(74) *Attorney, Agent, or Firm* — Clark & Brody (57) ABSTRACT

A method for heat treating a metal tube or pipe is provided to perform heat treatment in such a manner that metal tubes or pipes (1) to be accommodated in a heat treatment furnace are laid down on a plurality of cross beams (22) arranged along a longitudinal direction of the metal tubes or pipes with the distance between adjacent cross beams being in a range of 200 to 2500 mm. This makes it possible to inhibit bending and scratches of the metal tubes or pipes without causing discoloration and deterioration of the manufacturing efficiency for the metal tubes or pipes. When the metal tubes or pipes (1) are laid down on the cross beams (22), spacers may be interposed between the metal tubes or pipes (1) and the cross beams (22) on which they are laid down.

6 Claims, 3 Drawing Sheets

(51) Int. Cl.
| | |
|---|---|
| C22C 19/05 | (2006.01) |
| C22C 38/58 | (2006.01) |
| C22F 1/00 | (2006.01) |
| C22F 1/10 | (2006.01) |
| C21D 8/10 | (2006.01) |
| C22C 38/00 | (2006.01) |
| C22C 38/02 | (2006.01) |
| C22C 38/06 | (2006.01) |
| C22C 38/42 | (2006.01) |
| C22C 38/50 | (2006.01) |
| F22B 37/00 | (2006.01) |
| C21D 9/00 | (2006.01) |
| C22C 30/00 | (2006.01) |
| C22C 30/02 | (2006.01) |
| C22C 38/04 | (2006.01) |
| F16L 9/02 | (2006.01) |
| C22C 38/40 | (2006.01) |
| C21D 1/773 | (2006.01) |
| C21D 1/00 | (2006.01) |
| G21D 1/00 | (2006.01) |
| G21C 21/00 | (2006.01) |

(52) U.S. Cl.
CPC ............ *C22C 19/05* (2013.01); *C22C 19/053* (2013.01); *C22C 19/055* (2013.01); *C22C 19/056* (2013.01); *C22C 19/058* (2013.01); *C22C 30/00* (2013.01); *C22C 30/02* (2013.01); *C22C 38/001* (2013.01); *C22C 38/002* (2013.01); *C22C 38/02* (2013.01); *C22C 38/04* (2013.01); *C22C 38/06* (2013.01); *C22C 38/40* (2013.01); *C22C 38/42* (2013.01); *C22C 38/50* (2013.01); *C22C 38/58* (2013.01); *C22F 1/00* (2013.01); *C22F 1/10* (2013.01); *F16L 9/02* (2013.01); *F22B 37/007* (2013.01); *C21D 1/00* (2013.01); *C21D 1/773* (2013.01); *G21C 21/00* (2013.01); *G21D 1/00* (2013.01)

(58) Field of Classification Search
USPC .......................................................... 266/274
See application file for complete search history.

(56) References Cited

FOREIGN PATENT DOCUMENTS

| | | |
|---|---|---|
| JP | 4-13653 | 2/1992 |
| JP | 5-85840 | 11/1993 |
| JP | 6-221771 | 8/1994 |
| JP | 2002-263725 | 9/2002 |
| JP | 2003-247023 | 9/2003 |
| WO | 2011/093059 | 8/2011 |

* cited by examiner

METHOD FOR HEAT TREATING A METAL TUBE OR PIPE, METAL TUBE OR PIPE, AND HEAT TREATMENT FURNACE

TECHNICAL FIELD

The present invention relates to a method for heat treating a metal tube or pipe which is capable of inhibiting the occurrence of bending and scratches, a metal tube or pipe treated by the heat treatment method, and a heat treatment furnace for use in the heat treatment method.

BACKGROUND ART

In nuclear power plants, metal tubes or pipes may be used as heat exchanger tubes of a steam generator and as heat exchanger tubes of a heat exchanger such as a feed water heater. Hereinafter, heat exchanger tubes for a steam generator and heat exchanger tubes for a heat exchanger which are for use in nuclear power plants are also collectively referred to as metal tubes or pipes for nuclear power plants. Such metal tubes or pipes for nuclear power plants are made from a stainless steel exhibiting high corrosion resistance in a chloride-containing environment, or a nickel-based alloy exhibiting high intergranular corrosion resistance in a high temperature water environment.

Typically, in the manufacture of metal tubes or pipes for nuclear power plants, after tubes or pipes have been formed into a predetermined size, they are subjected to a solution heat treatment (a first heat treatment), and further to a second heat treatment for finishing. The second heat treatment may be intended to relieve residual stress of the metal tube or pipe resulting from straightening and polishing processes that are performed after the solid solution treatment (the first heat treatment). Furthermore, the second heat treatment may be intended to enhance the intergranular corrosion resistance of the metal tube or pipe by allowing precipitation of Cr carbides along the grain boundaries in addition to relieving residual stress as described above.

When the second heat treatment is intended for precipitation of Cr carbides along the grain boundaries in addition to relief of residual stress, it is accomplished by soaking at a temperature between about 690° C. and about 740° C. for 2 hours or more, preferably for 5 hours or more. When the second heat treatment is intended only for relief of residual stress, it is accomplished by soaking at a temperature between about 690° C. and about 740° C. for 0.5 hours or more, preferably for 2 hours or more.

The second heat treatment may be carried out in a batch fashion in which a plurality of metal tubes or pipes laid down on a cart, a tray, or the like are accommodated in a furnace and subjected to a heat treatment.

Figure 1:
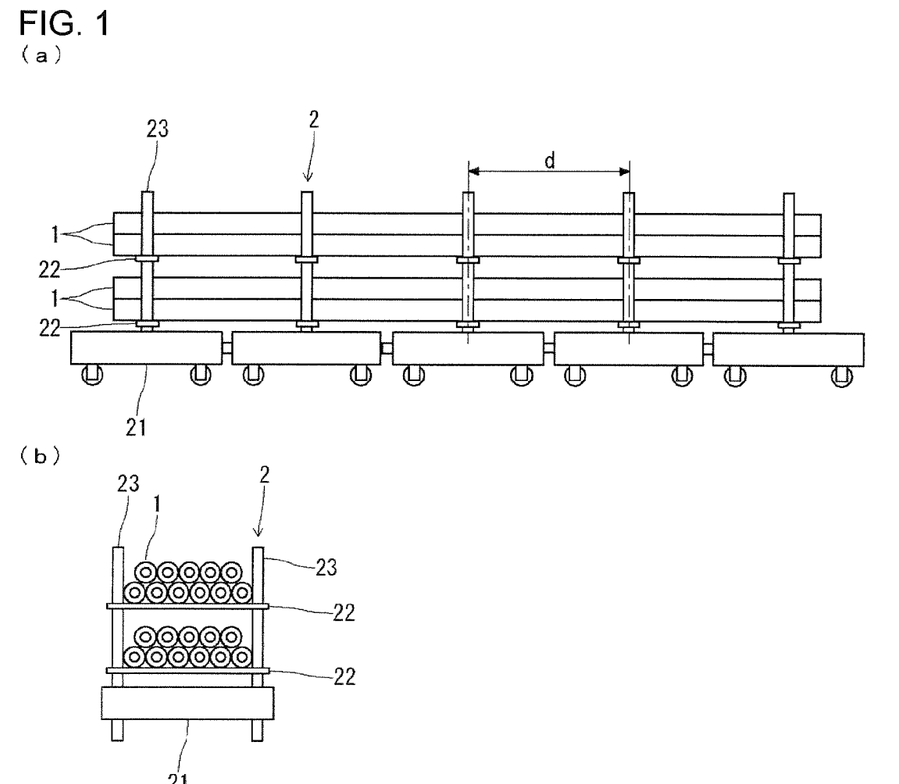
FIG. 1 is a diagram showing a cart which is for use in a heat treatment furnace, and on which metal tubes or pipes are laid down.

FIG. 1 is a diagram showing a cart which is for use in a heat treatment furnace, and on which metal tubes or pipes are laid down. FIG. 1(a) is a front view thereof and FIG. 1(b) is a side view thereof. The cart 2 shown in FIG. 1 is composed of carriages 21 having wheels, support pillars 23 fixed to each carriage, and cross beams 22 mounted between each pair of support pillars 23. When a heat treatment is applied to a metal tube or pipe in a heat treatment furnace using a cart of the type shown in FIG. 1, it is performed in such a manner that a plurality of metal tubes or pipes 1 are laid down on the cross beams 22, and in this state, the cart is accommodated in the heat treatment furnace to subject the metal tubes or pipes to heating.

It is noted that the metal tubes or pipes 1 are not limited to straight tubes or pipes as shown in FIG. 1, and that bent tubes or pipes formed by a bending process may also be heat treated by being accommodated in a heat treatment furnace in a state in which they are laid down on the cross beams 22. Furthermore, the metal tubes or pipes 1 may be stacked in two tiers with metal tubes or pipes being laid down on metal tubes or pipes that have been laid down on the cross beams as shown in FIG. 1.

Metal tubes or pipes for nuclear power plants typically have a diameter of 15 to 22 mm, a wall thickness of 0.9 to 1.3 mm, and a length of 15,000 to 27,000 mm, and thus they have a long length. Because of this, in order to prevent deformation of the laid down metal tubes or pipes during heat treatment, which may result from flexure thereof, the cart 2 is provided with a plurality of cross beams 22 arranged along the longitudinal direction of the metal tubes or pipes. Furthermore, in order to arrange the cross beams over the entire length of the metal tubes or pipes, the cart 2 is constituted by a plurality of carriages 21 that are coupled together.

In the case of metal tubes or pipes for nuclear power plants, if they undergo bending due to deformation caused by flexure during the second heat treatment, they will interfere with tube support plates when they are installed as heat exchanger tubes in a steam generator, and may break during operation, which could result in a serious accident. Thus, for heat exchanger tubes for a steam generator of a nuclear power plant, it is typically required that the amount of bending be 0.50 to 1.00 mm or less per 1000 mm longitudinal length.

If the amount of bending exceeds the tolerance, it is necessary to eliminate the bending by straightening the metal tubes or pipes. If straightening is performed through a cold rolling mill or a straightener, residual stress, which has been relieved from the metal tube or pipe by the second heat treatment, will occur again. Because of this, the straightening operation is inevitably carried out in such a manner as local straightening by hand work. Thus, the efficiency in manufacturing metal tubes or pipes significantly deteriorates if bending due to flexure occurs in the second heat treatment.

In the meantime, during heat treatment, a metal tube or pipe undergoes thermal expansion in a longitudinal direction thereof by being heated to an elevated temperature. During the process, a cart or a tray that is used for laying down of the metal tube or pipe also thermally expands, but its coefficient of thermal expansion differs from that of the metal tube or pipe, and long-length metal tubes or pipes exhibit a larger amount of deformation. As a result, rubbing occurs between the metal tubes or pipes and the region of the cart or the tray where the metal tubes or pipes are laid down, which results in scraping-off of the outer surface of the metal tubes or pipes so that recesses are formed therein.

Scratches in the form of recesses can be initiation sites for corrosion of a metal tube or pipe and could result in a serious accident when metal tubes or pipes are used in a nuclear power plant. Therefore, in metal tubes or pipes for nuclear power plants, it is required that the depth and length of scratches are equal to or smaller than those of a standard limit sample. In general, standard limit samples of scratches are fabricated by artificially scraping the outer surface of the metal tubes or pipes to form scratches. The formed scratches are 0.01 to 0.1 mm in depth and 10 to 100 mm in length.

If the depth and length of the scratches formed in the outer surface of the metal tubes or pipes in the second heat treatment exceed those of the standard limit sample, it is necessary to polish the outer surface of the metal tubes or pipes to eliminate the scratches. If the polishing is mechanically performed, residual stress, which has been relieved from the metal tube or pipe by the second heat treatment, will occur again. Therefore the polishing must be carried out by hand work. Consequently, the efficiency in manufacturing metal tubes or pipes significantly deteriorates.

With regard to inhibition of such bending or scratches resulting from heat treatment, there are various conventional proposals as disclosed in Patent Literatures 1 to 5, for example. Patent Literature 1 proposes a stacking tray unit, including: support pillars and a plurality of trays attached thereto at predetermined spacings, wherein each of the trays is composed of a plate member having higher thermal conductivity in a length direction than in a thickness direction. It is stated that high-quality products can be produced by performing a heat treatment using such a stacking tray unit, on which workpieces to be treated are laid down, because temperature variations can be reduced in the heated workpieces.

With the use of the stacking tray unit to heat treat metal tubes or pipes, it is possible to inhibit bending of the resulting metal tubes or pipes because the trays provide support for the metal tubes or pipes in a longitudinal direction with reduced temperature variations. However, the stacking tray unit proposed in Patent Literature 1 has a problem in that contact of the metal tubes or pipes with the trays causes formation of scratches on their outer surfaces along a longitudinal direction.

Patent Literature 2 proposes a cushioning material in sheet form, including: high temperature fibers and inorganic fibers which are mixed with each other or disposed in layers, and integrated by needle punching. Patent Literature 3 proposes a heat resistant cushioning material, including: a plurality of stacked heat resistant sheet materials which are integrated using a heat resistant thread or a high temperature adhesive. If metal tubes or pipes are laid down on cross beams with either of these cushioning materials interposed therebetween, a great effect of preventing scratches is obtained. However, the gas that is produced by heating the cushioning material causes discoloration of the outer surface of the metal tubes or pipes.

Discoloration of a metal tube or pipe impairs the aesthetics thereof and decreases its commercial value. Moreover, when they are used as a metal tube or pipe for nuclear power plants, the discoloration can be an initiation point for corrosion and could result in a serious accident. Thus, the discoloration of the metal tube or pipe needs to be eliminated by manual polishing, and this leads to significant deterioration of the manufacturing efficiency for metal tubes or pipes.

Patent Literature 4 proposes a method for heat treating a metal tube or pipe, including: interposing a heat resistant fabric having a thickness of 0.1 to 1.2 mm between a metal tube or pipe and cross beams on which the metal tube or pipe is laid down. Patent Literature 4 also discloses that, in order to remove water remaining in the heat resistant fabric that can be a cause of discoloration, it is preferred that, in the heat treatment, the heating in the temperature range between 100° C. and 300° C. be performed for 30 minutes or more. Thus, the method for heat treating a metal tube or pipe proposed in Patent Literature 4 may lead to deterioration of the manufacturing efficiency for metal tubes or pipes.

Patent Literature 5 proposes a steel bar accommodation pallet, including: a grid-shaped member disposed at a location where the workpieces to be treated are laid down. It is stated that the grid-shaped member structurally has high stiffness and good durability, and therefore, with a minimum weight, it is capable of supporting the workpieces to be treated and minimizing hindrance to heat input to them. If an accommodation pallet including such a grid-shaped member is used to heat treat a metal tube or pipe that is laid down thereon, it is expected that bending will be inhibited. However, the increase in contact area between the metal tube or pipe and the grid-shaped member results in formation of scratches on the metal tube or pipe.

CITATION LIST

Patent Literature

Patent Literature 1: Japanese Utility Model Application Publication No. H04-13653
Patent Literature 2: Japanese Utility Model Application Publication No. S60-362
Patent Literature 3: Japanese Utility Model Application Publication No. H05-85840
Patent Literature 4: WO 2011/093059
Patent Literature 5: Japanese Patent Application Publication No. 2003-247023

SUMMARY OF INVENTION

Technical Problem

As described above, in heat treatments of metal tubes or pipes, there are problems of bending and scratches of treated metal tubes or pipes. The heat treatment methods proposed in Patent Literatures 1 and 5 as described above are expected to inhibit bending, but causes formation of scratches. The cushioning materials proposed in Patent Literatures 2 and 3 are expected to inhibit bending and scratches, but will cause discoloration and thus pose a problem. The heat treatment method proposed in Patent Literature 4 is expected to inhibit bending and scratches without causing discoloration. However, it may lead to deterioration of the manufacturing efficiency for metal tubes or pipes because heating in the temperature range between 100° C. and 300° C. should preferably be performed for 30 minutes or more.

The present invention has been made in view of the above circumstances. Accordingly, it is an object of the present invention to provide a method for heat treating a metal tube or pipe which is capable of inhibiting bending and scratches without causing discoloration and deterioration of the manufacturing efficiency. It is also an object of the present invention to provide a metal tube or pipe manufactured using the heat treatment method and a heat treatment furnace for metal tubes or pipes for use in the heat treatment method.

Solution to Problem

In order to avoid the problem of discoloration, the present inventors searched for methods for inhibiting bending and scratches without the use of a cushioning material or a heat resistant fabric. Consequently, they turned their attention to the arrangement of a plurality of cross beams that are arranged along the longitudinal direction. Specifically, a test was conducted in which: a heat treatment was performed using a cart as shown in FIG. 1 while the distance d (see FIG. 1) between adjacent cross beams was varied in the range of 100 to 3000 mm. As the profile of the top surface of the cross beams on which metal tubes or pipes are laid down, a flat surface as shown in FIG. 2 mentioned below was employed.

Figure 2:
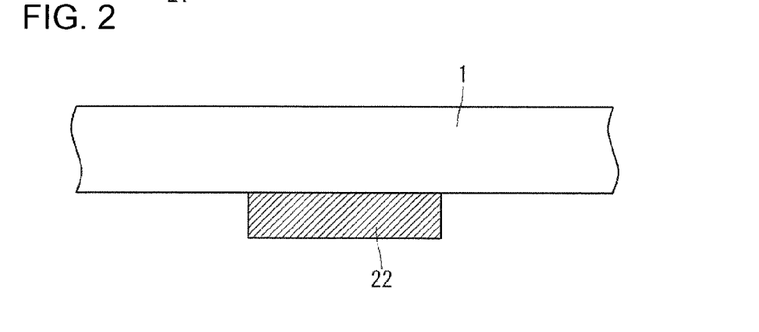
FIG. 2 is a front cross-sectional view of a cross beam having a flat top surface profile.

FIG. 2 is a front cross-sectional view of a cross beam having a flat top surface profile. In FIG. 2, a cross beam 22 having a flat top surface profile and a metal tube or pipe 1 laid down on the cross beam 22 are shown. In the test, in which cross beams having a flat top surface were used, eleven metal tubes or pipes were laid down on the cross beams in a single tier without stacking metal tubes or pipes on the metal tubes or pipes. The test conditions regarding metal tubes or pipes and heat treatment were the same as those for the test using straight pipes of Example as described later. Regarding the metal tubes or pipes after the treatment, examinations were conducted to find the amount of bending per 1000 mm and the number of scratches having a depth of 0.01 mm or more and a length of 10 mm or more. The examinations regarding the amount of bending per 1000 mm and the number of scratches were carried out by the same procedure as in the test of Example which will be described later.

Figure 3:
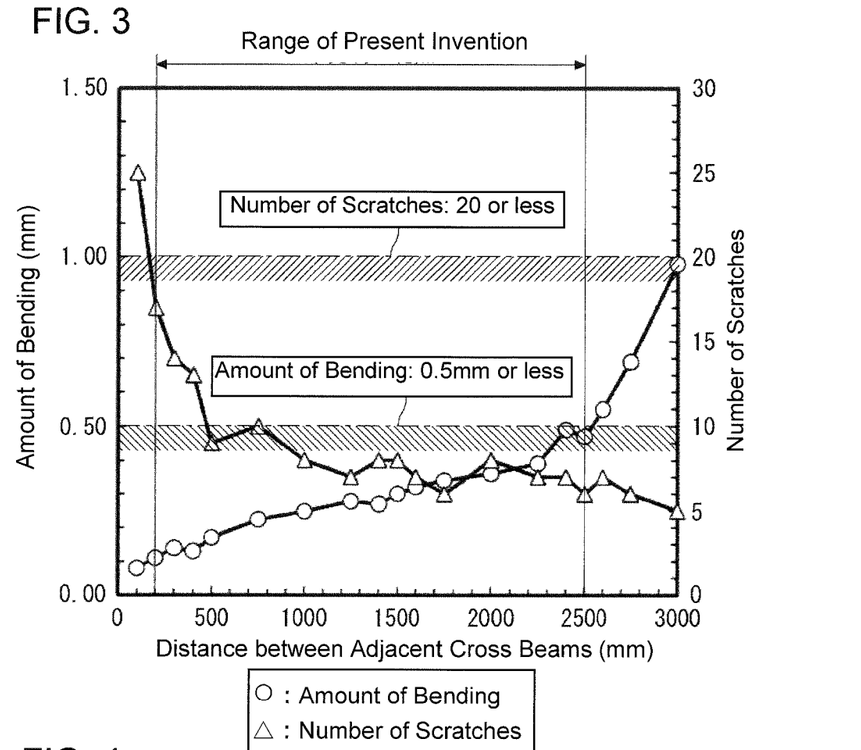
FIG. 3 is a graph showing the relationship between the distance between adjacent cross beams and bending, and the relationship between the distance between adjacent cross beams and scratches, in the case where cross beams having a flat top surface profile is used.

FIG. 3 is a graph showing the relationship between the distance between adjacent cross beams and bending, and the relationship between the distance between adjacent cross beams and scratches, in the case where cross beams having a flat top surface profile are used. From FIG. 3, it is seen that the amount of bending of the treated metal tubes or pipes is correlated to the distance between adjacent cross beams, and that the amount of bending tends to increase as the distance between adjacent cross beams increases. This is because, as the distance between adjacent cross beams increases, the flexure of the metal tubes or pipes when they are laid down increases.

In the meantime, it is seen that the number of scratches that occur in the treated metal tubes or pipes is also correlated to the distance between adjacent cross beams, and that the number of scratches tends to increase as the distance between adjacent cross beams decreases. This is because, as the distance between adjacent cross beams decreases, the contact area between the metal tubes or pipes and the cross beams increases, i.e., the area where scratches can be formed increases.

If the amount of bending per 1000 mm is 0.5 mm or less, it is smaller than the tolerance for the amount of bending as previously noted, and therefore the work of straightening after the second heat treatment is unnecessary in the manufacture of metal tubes or pipes for nuclear power plants. In the meantime, if the number of scratches having a depth of 0.01 mm or more and a length of 10 mm or more is 20 or less, the formed scratches are negligible, and therefore elimination of scratches by polishing may be unnecessary depending on the standard limit sample. Even when the requirements regarding scratches are stringent, the manufacturing efficiency for metal tubes or pipes for nuclear power plants rarely decreases because their elimination can be readily accomplished by manual polishing.

In order to satisfy the conditions of the bending amount of 0.5 mm or less per 1000 mm and the number of scratches being 20 or less, it has been found that the distance between adjacent cross beams needs to be limited to the range of 200 to 2500 mm as shown in FIG. 3.

In order to further inhibit bending and scratches, the present inventors turned their attention to the profile of the surface on which the metal tubes or pipes are laid down, and made an attempt to adopt a convex profile for the surface of cross beams on which the metal tubes or pipes are laid down. Specifically, attempts were made to use a cross beam having a convex top surface, on which a metal tube or pipe is laid down, and also, to use a spacer having a convex top surface to be interposed between a metal tube or pipe and a cross beam.

Figure 4:
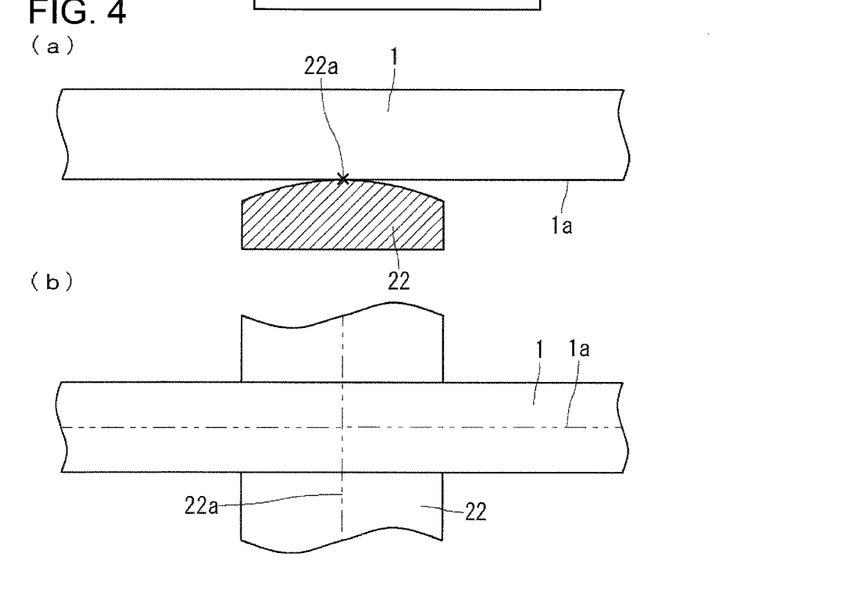

FIG. 4 shows views of a cross beam having a convex top surface, in which FIG. 4(a) is a front cross-sectional view and FIG. 4(b) is a top view. FIG. 4 shows a cross beam 22 having a circular arc top surface, i.e., a convexly curved surface and a metal tube or pipe 1 laid down on the cross beam 22. As shown in FIG. 4(a), when the metal tube or pipe 1 is laid down on the cross beam 22 having a convex top surface, a bottom portion 1a of the outer surface of the metal tube or pipe to be laid down, which is a vertically lowermost portion thereof, and a vertex portion 22a of the top surface of the cross beam 22, which is a vertically uppermost portion thereof are brought into contact with each other. Also, as shown in FIG. 4(b), the bottom portion 1a, which is in the form of a line, of the outer surface of the metal tube or pipe and the vertex portion 22a, which is in the form of a line, of the top surface of the cross beam are orthogonal to each other.

Figure 5:
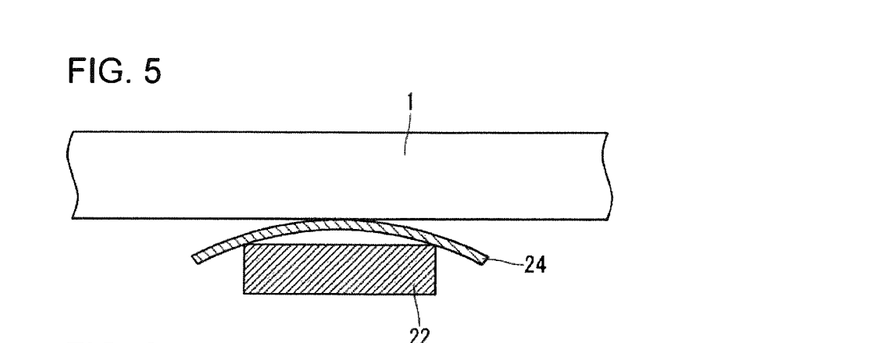
FIG. 5 is a front cross-sectional view of a spacer having a convex top surface.

FIG. 5 is a front cross-sectional view of a spacer having a convex top surface. FIG. 5 shows a cross beam 22 having a flat top surface, a metal tube or pipe 1 laid down on the cross beam 22, and a spacer 24 having a circular arc top surface, i.e., a convexly curved top surface, interposed between the metal tube or pipe 1 and the cross beam 22. As with the case of the cross beam having a convex top surface, the spacer 24 is placed in such a manner that the bottom portion of the outer surface of the metal tube or pipe 1, which is in the form of a line, and the vertex portion of the top surface of the spacer 24, which is in the form of a line, are orthogonal to each other, so that the metal tube or pipe 1 is laid down on the cross beam 22 with the spacer 24 interposed therebetween.

The present inventors conducted a test by using a spacer having a convex top surface as described above to perform heat treatment and making investigation into bending and scratches of the treated metal tube or pipe. In the test, the radius of curvature of the top surface of the spacer was 100 mm, and the distance d between adjacent cross beams was varied in the range of 100 to 3000 mm. The test conditions, except for the use of the spacer, were the same as those for the test using a cross beam having a flat top surface.

Figure 6:
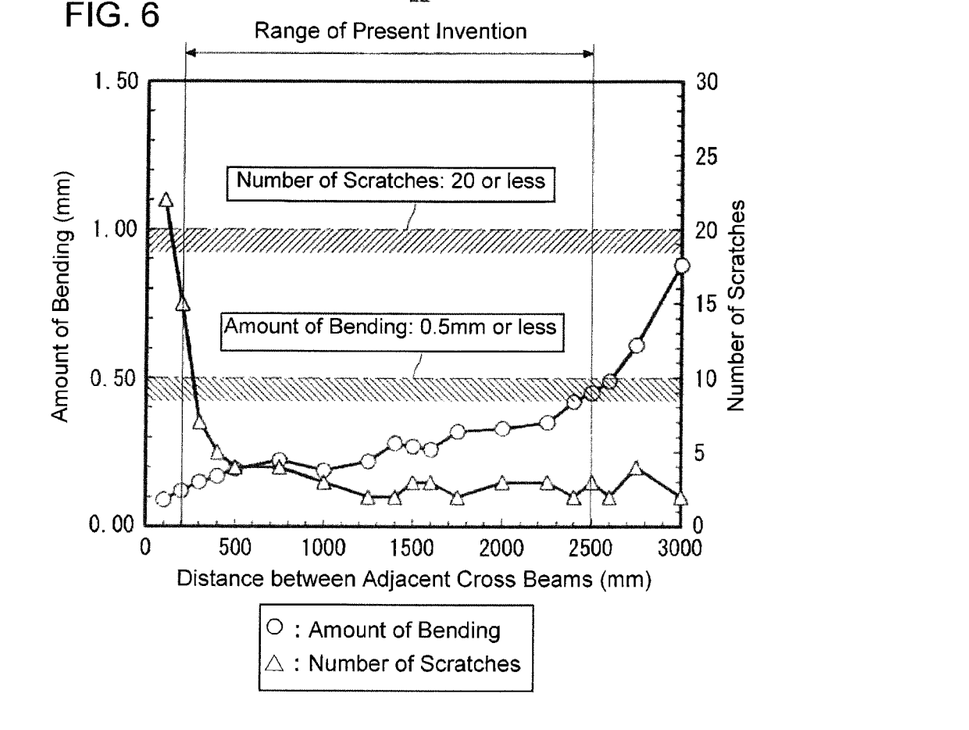
FIG. 6 is a graph showing the relationship between the distance between adjacent cross beams and bending, and the relationship between the distance between adjacent cross beams and scratches, in the case where spacers having a convex top surface are used.

FIG. 6 is a graph showing the relationship between the distance between adjacent cross beams and bending, and the relationship between the distance between adjacent cross beams and scratches, in the case where spacers having a convex top surface are used. From FIG. 6 and FIG. 3 as referred to above, it has been found that the profile of the surface on which a metal tube or pipe is laid down has little influence on bending of a metal tube or pipe. In the meantime, it has been found that formation of scratches is affected by the profile of the surface on which a metal tube or pipe is laid down and that further inhibition of scratches is made possible by adopting a convex profile for the surface on which the metal tube or pipe is laid down.

This is due to the fact that, as stated above, the area of the outer surface of the metal tubes or pipes where scratches can occur is further decreased because the contact between the metal tube or pipe and the spacer is in such a form that the bottom portion of the outer surface of the metal tube or pipe and the vertex portion of the top surface of the spacer, which are both in the form of a line, are in contact orthogonally, and therefore the contact area between them is very small, nearly forming a point contact.

The present inventors have verified that the use of a cross beam having a convex top surface as shown in FIG. 4 results in a similar tendency to the case with a spacer having a convex top surface.

The present invention has been accomplished based on the above findings, and the summaries thereof are as follows: methods for heat treating a metal tube or pipe as stated in the items (1) to (4) below; a metal tube or pipe as stated in the item (5) below; and batch-type vacuum heat treatment furnaces as stated in the items (6) to (8) below.

(1) A method for heat treating a metal tube or pipe, comprising: heat treating a metal tube or pipe which is accommodated in a heat treatment furnace, the metal tube or pipe being laid down on a plurality of cross beams, the plurality of cross beams being arranged along a longitudinal direction of the metal tube or pipe such that the distance between adjacent ones of the cross beams is in a range of 200 to 2500 mm.

(2) The method for heat treating a metal tube or pipe according to the above item (1), wherein, as the cross beams, cross beams having a convex top surface are used.

(3) The method for heat treating a metal tube or pipe according to the above item (1), wherein, when the metal tube or pipe is laid down on the cross beams, the metal tube or pipe is laid down on the cross beams with a spacer having a convex top surface interposed therebetween.

(4) The method for heat treating a metal tube or pipe according to any one of the above items (1) to (3), wherein the metal tube or pipe has a composition consisting of, in mass %, C: 0.15% or less, Si: 1.00% or less, Mn: 2.0% or less, P: 0.030% or less, S: 0.030% or less, Cr: 10.0% to 40.0%, Ni: 8.0% to 80.0%, Ti: 0.5% or less, Cu: 0.6% or less, Al: 0.5% or less, and N: 0.20% or less, the balance being Fe and impurities.

(5) A metal tube or pipe that has been heat treated using the method for heat treating a metal tube or pipe according to any one of the above items (1) to (4).

(6) A heat treatment furnace that performs heat treatment on a metal tube or pipe, the metal tube or pipe being accommodated in the heat treatment furnace in a state where the metal tube or pipe is laid down on a plurality of cross beams, the plurality of cross beams being arranged along a longitudinal direction of the metal tube or pipe such that the distance between adjacent ones of the cross beams is in a range of 200 to 2500 mm.

(7) The heat treatment furnace according to the above item (6), wherein the cross beams have a convex top surface.

(8) The heat treatment furnace according to the above item (6), wherein the heat treatment furnace further includes spacers having a convex top surface, the spacers being interposed between the cross beams and the metal tube or pipe that is laid down thereon.

Advantageous Effects of Invention

The method for heat treating a metal tube or pipe of the present invention has the following advantageous effects:

(1) It is possible to inhibit bending of treated metal tubes or pipes and obviate the need to perform straightening operations after heat treatment. This is accomplished by arranging a plurality of cross beams, on which the metal tubes or pipes are laid down, in such a manner that the distance between adjacent cross beams is in the range of 200 to 2500 mm.

(2) Furthermore, it is possible to inhibit scratches of treated metal tubes or pipes, and thus it may be unnecessary to perform polishing after heat treatment for elimination of scratches depending on the standard limit sample. Even when elimination of scratches is necessary, the load therefor can be reduced.

(3) It is possible to heat treat metal tubes or pipes without causing discoloration of the metal tubes or pipes and without causing deterioration of the manufacturing efficiency due to a longer heating time that is required.

The metal tubes or pipes of the present invention exhibit high corrosion resistance because they have been subjected to heat treatment using the method for heat treating a metal tube or pipe of the present invention as described above so that bending and scratches have been inhibited.

A heat treatment furnace for metal tubes or pipes of the present invention is capable of readily implementing the method for heat treating a metal tube or pipe of the present invention as described above because a plurality of cross beams are arranged in such a manner that the distance between adjacent cross beams is in the range of 200 to 2500 mm.

BRIEF DESCRIPTION OF DRAWINGS

FIG. 1(a) is a front view thereof and FIG. 1(b) is a side view thereof.

FIG. 4 shows views of a cross beam having a convex top surface, in which FIG. 4(a) is a front cross-sectional view and FIG. 4(b) is a top view.

DESCRIPTION OF EMBODIMENTS

The following are descriptions of a method for heat treating a metal tube or pipe of the present invention, a metal tube or pipe treated by the heat treatment method, and a heat treatment furnace for use in the heat treatment method.

[Method for Heat Treating a Metal Tube or Pipe]

The method for heat treating a metal tube or pipe of the present invention includes: heat treating a metal tube or pipe which is accommodated in a heat treatment furnace, the metal tube or pipe being laid down on a plurality of cross beams, the plurality of cross beams being arranged along a longitudinal direction of the metal tube or pipe such that the distance between adjacent cross beams is in the range of 200 to 2500 mm. In the present invention, the distance d between adjacent cross beams is determined as follows: in the case of using cross beams having a flat top surface, it is determined using the centers of the cross beams as the reference position wherein the centers are central positions relative to the longitudinal direction of the metal tube or pipe to be laid down; and in the case of using cross beams having a convex top surface, it is determined using the vertex portions of the top surfaces of the cross beams as the reference position. Furthermore, when a metal tube or pipe is laid down on the cross beams with spacers interposed therebetween, the distance d between adjacent cross beams is determined as follows: in the case of using spacers having a flat top surface, it is determined using the centers of the spacers as the reference position wherein the centers are central positions relative to the longitudinal direction of the metal tube or pipe to be laid down; and in the case of using spacers having a convex top surface, it is determined using the vertex portions of the top surfaces of the spacers as the reference position.

As clarified in FIGS. 3 and 6, by setting the distance between adjacent cross beams to be in the range of 200 to 2500 mm, it is possible to inhibit bending and scratches of the treated metal tube or pipe. Thus, even when the treated metal tubes or pipes are to be used as metal tubes or pipes for nuclear power plants, no straightening operations by hand work are necessary. In addition, elimination of scratches by polishing after the second heat treatment may be unnecessary depending on the standard limit sample, or, even when elimination of scratches is necessary, the load therefor can be reduced. Therefore, the method for heat treating a metal tube or pipe of the present invention is capable of increasing the efficiency in manufacturing metal tubes or pipes for nuclear power plants.

The method for heat treating a metal tube or pipe of the present invention is capable of avoiding the problem of discoloration of a metal tube or pipe because no cushioning material is used. Furthermore, the method for heat treating a metal tube or pipe of the present invention does not cause deterioration of the manufacturing efficiency due to requirements for a longer heating time. This is because no heat resistant fabric is used, and therefore it is unnecessary to perform the heating in the temperature range of 100° C. to 300° C. for a period of 30 minutes or more.

When the distance between adjacent cross beams is less than 200 mm, the occurrence of scratches significantly increases. In the meantime, when the distance between adjacent cross beams exceeds 2500 mm, bending of the metal tubes or pipes increases. For this reason, the distance between adjacent cross beams is set to be in the range of 200 to 2500 mm. A preferred distance between adjacent cross beams is in the range of 300 to 2000 mm More preferably, it is in the range of 500 to 1500 mm.

In the method for heat treating a metal tube or pipe of the present invention, it is preferred that cross beams having a convex top surface as shown in FIG. 4 be used as the cross beams. This makes it possible to further inhibit scratches of treated metal tubes or pipes. While it is preferred that the top surface of the cross beams have a convex shape, the back surface thereof may be of any shape. For example, cross beams having a circular cross section or an elliptical cross section may be used. Also, cross beams formed of parts having a semi-circular cross section vertically joined together to have a circular cross section may be used.

In the method for heat treating a metal tube or pipe of the present invention, the metal tube or pipe may not necessarily be in direct contact with the cross beams, but may be laid down on the cross beams in such a manner that spacers are interposed therebetween. The top surface of the spacers may be flat, but may preferably be convexly shaped as shown in FIG. 5 in order to further inhibit scratches of treated metal tubes or pipes. As the spacer having a convex top surface, a spacer of a metal plate formed to have a convex top surface by a bending process or a spacer having a semi-circular cross section may be used, for example.

Although the spacers may be fixed to the cross beams, they may preferably be disposed in such a manner that they are movable in a longitudinal direction of the metal tube or pipe to be laid down, as shown in FIG. 5. This allows the spacers to move in response to the thermal expansion of the metal tube or pipe, and therefore makes it possible to reduce the length of the region between the outer surface of the metal tube or pipe and the spacer where rubbing occurs and thus to reduce the length of scratches that occur.

The material for the cross beams and the spacers may be appropriately selected in accordance with the heat treatment temperature. For example, cross beams made of metal and spacers made of metal may be employed. The material for the cross beams and the spacers may be more preferably one having a coefficient of thermal expansion close to that of the metal tube or pipe, which is a workpiece to be treated. For example, cross beams and spacers made of the same material as that for the metal tube or pipe, which is a workpiece to be treated, may be more preferable. Specifically, a metal tube or pipe made of the same material as that for the workpiece to be treated may be cut into pieces having a predetermined length and they may be used as the cross beams. Also, the spacers may be formed by cutting a metal tube or pipe, made of the same material as that for the metal tube or pipe to be treated, into pieces having a predetermined length, and flattening them, and then subjecting them to bending so that they have a convex top surface. The thus formed spacers may be used.

In the method for heat treating a metal tube or pipe of the present invention, either in the case of employing cross beams having a convex top surface, on which a metal tube or pipe is laid down, or in the case of employing spacers having a convex top surface, via which a metal tube or pipe is laid down on cross beams, it is preferred that the convex top surface have a radius of curvature of 50 to 300 mm. If the radius of curvature of the convex top surface is less than 50 mm, the contact area between the metal tube or pipe and the cross beams or the spacers decreases and accordingly the area where scratches can be formed decreases. However, there is an increased tendency for deep scratches to be formed. As a result, the number of scratches will somewhat increase as shown in the later-described examples. On the other hand, if the radius of curvature of the convex top surface is greater than 300 mm, the advantage of inhibiting scratches achieved by adopting a convexly shaped top surface will be reduced.

The method for heat treating a metal tube or pipe of the present invention is not limited to any particular type of metal tube or pipe as a workpiece to be treated as long as it can be laid down on a plurality of arranged cross beams. Both straight tubes or pipes and bent tubes or pipes can be heat treated by the method.

As described in the foregoing, the method for heat treating a metal tube or pipe of the present invention is capable of inhibiting bending and scratches of treated metal tubes or pipes, and therefore it is suitable for the second heat treatment for heat exchanger tubes for a heat exchanger to be used in nuclear power plants, for which stringent control of bending and scratches is required. As for heat exchanger tubes for a steam generator, even more stringent control of bending and scratches is required, and therefore the method for heat treating a metal tube or pipe of the present invention is particularly suitable for the second heat treatment for heat exchanger tubes for a steam generator to be used in nuclear power plants.

[Composition of Metal Tube or Pipe]

In the method for heat treating a metal tube or pipe of the present invention, it is preferred to use a metal tube or pipe having a composition consisting of, in mass %, C: 0.15% or less, Si: 1.00% or less, Mn: 2.0% or less, P: 0.030% or less, S: 0.030% or less, Cr: 10.0% to 40.0%, Ni: 8.0% to 80.0%, Ti: 0.5% or less, Cu: 0.6% or less, Al: 0.5% or less, and N: 0.20% or less, the balance being Fe and impurities.

The term "impurities" refers to components that are introduced from metal ores, scrap, or the like when metal tubes or pipes are industrially manufactured, and which are acceptable within a range that does not adversely affect the present invention.

The reasons for setting limitations to each element are as follows. It is noted that in the description below, "%" relating to the content refers to "mass %".

C: 0.15% or Less

If the C content is greater than 0.15%, stress corrosion cracking resistance may be degraded. Therefore, when C is contained, the content is preferably 0.15% or less, and more preferably 0.06% or less. It is noted that C has the effect of increasing the grain boundary strength of an alloy. In order to produce this effect, the C content should preferably be 0.01% or more.

Si: 1.00% or Less

Si is used as a deoxidizer during smelting and remains in an alloy as an impurity. Thus, its content is preferably limited to 1.00% or less. If the Si content is greater than 0.50%, the cleanliness of the alloy may decrease, and therefore the Si content is more preferably limited to 0.05% or less.

Mn: 2.0% or Less

Mn acts to immobilize S, which is an impurity element, as MnS to improve hot workability, and it is an effective element as a deoxidizer. If its content is greater than 2.0%, the cleanliness of the alloy will be degraded, and therefore the content thereof is preferably 2.0% or less. More preferably, the content is 1.0% or less. Moreover, when it is desired to obtain the effect of improving hot workability achieved by Mn, the Mn content should preferably be 0.1% or more.

P: 0.030% or Less

P is an element that is present as an impurity in an alloy. If its content is greater than 0.030%, it may have an adverse effect on corrosion resistance. Thus, the P content is preferably limited to 0.030% or less.

S: 0.030% or Less

S is an element that is present as an impurity in an alloy. If its content is greater than 0.030%, it may have an adverse effect on corrosion resistance. Thus, the S content is preferably limited to 0.030% or less.

Cr: 10.0% to 40.0%

Cr is an element necessary to maintain corrosion resistance of an alloy, and its content is preferably 10.0% or more. However, if the Cr content is greater than 40.0%, the Ni content will be relatively reduced, and therefore corrosion resistance and hot workability of the alloy may decrease. Thus, the Cr content is preferably in the range of 10.0% to 40.0%. In particular, when the Cr content is in the range of 14.0% to 17.0%, high corrosion resistance in a chloride-containing environment is obtained. Furthermore, when the Cr content is in the range of 27.0% to 31.0%, high corrosion resistance in pure water and in an alkaline environment at high temperatures is also obtained.

Ni: 8.0% to 80.0%

Ni is an element necessary to ensure corrosion resistance of an alloy, and it is preferably contained in an amount of 8.0% or more. In the meantime, since Ni is expensive, it will be sufficient if a minimum necessary amount thereof is contained depending on use. It is preferred that the Ni content be 80.0% or less.

Ti: 0.5% or Less

If the Ti content is greater than 0.5%, the cleanliness of the alloy may be degraded, and therefore the content is preferably 0.5% or less, and more preferably 0.4% or less. However, in order to enhance the workability of an alloy and suppress grain growth during welding, it is preferably contained in an amount of 0.1% or more.

Cu: 0.6% or Less

Cu is an element that is present as an impurity in an alloy. If its content is greater than 0.6%, the corrosion resistance of the alloy may decrease. Thus, the Cu content is preferably limited to 0.6% or less.

Al: 0.5% or Less

Al is used as a deoxidizer during smelting and remains in an alloy as an impurity. The remaining Al may become oxide inclusions in the alloy, which may degrade the cleanliness of the alloy and may have an adverse effect on the corrosion resistance and mechanical properties of the alloy. Thus, the Al content is preferably limited to 0.5% or less.

N: 0.20% or Less

While N may not necessarily be added, N is normally contained in an amount of about 0.01% as an impurity in an alloy that is within the scope of the present invention. In the meantime, if N is intentionally added, it is possible to increase the strength without degrading the corrosion resistance. However, the N content of greater than 0.20% will result in a reduced corrosion resistance, and therefore the upper limit of the N content is preferably 0.20% when N is added.

Among metal tubes or pipes for nuclear power plants having the above-described compositions, particularly preferred is a Ni-based alloy tube or pipe which has a composition consisting of, C: 0.15% or less, Si: 1.00% or less, Mn: 2.0% or less, P: 0.030% or less, S: 0.030% or less, Cr: 10.0% to 40.0%, Fe: 15.0% or less, Ti: 0.5% or less, Cu: 0.6% or less, and Al: 0.5% or less, the balance being Ni and impurities because it exhibits higher corrosion resistance. In order to further increase the corrosion resistance, the balance Ni may be partially replaced by one or more of: Ca, Mg, B and a rare earth metal. In this case, a preferred range of addition of these is from 0.001% to 0.1% in total.

The following are two typical examples of Ni-based alloys having the above composition which are preferably used in metal tubes or pipes.

(a) A Ni-based alloy consisting of C: 0.15% or less, Si: 1.00% or less, Mn: 2.0% or less, P: 0.030% or less, S: 0.030% or less, Cr: 14.0% to 17.0%, Fe: 6.0% to 10.0%, Ti: 0.5% or less, Cu: 0.6% or less, and Al: 0.5% or less, the balance being Ni and impurities.

(b) A Ni-based alloy consisting of C: 0.06% or less, Si: 1.00% or less, Mn: 2.0% or less, P: 0.030% or less, S: 0.030% or less, Cr: 27.0% to 31.0%, Fe: 7.0% to 11.0%, Ti: 0.5% or less, Cu: 0.6% or less, and Al: 0.5% or less, the balance being Ni and impurities.

The alloy of the above (a) contains 14.0% to 17.0% Cr and about 75% Ni, and therefore exhibits high corrosion resistance in a chloride-containing environment. In this alloy, in view of balance between the Ni content and the Cr content, the Fe content is preferably in the range of 6.0% to 10.0%.

The alloy of the above (b) contains 27.0% to 31.0% Cr and about 60% Ni, and therefore exhibits high corrosion resistance in a chloride-containing environment, and also in pure water and in an alkaline environment at high temperatures. In this alloy, too, in view of balance between the Ni content and the Cr content, the Fe content is preferably in the range of 7.0% to 11.0%.

[Metal Tube or Pipe]

Metal tubes or pipes of the present invention are formed by being heat treated using the method for heat treating a metal tube or pipe of the present invention as described above. Thus, in metal tubes or pipes of the present invention, discoloration due to heat treatment does not occur, and bending and scratches are inhibited. The metal tubes or pipes of the present invention may either be straight tubes or pipes or bent tubes or pipes. Such metal tubes or pipes of the present invention exhibit high corrosion resistance, and therefore are suitable as metal tubes or pipes for nuclear power plants.

[Heat Treatment Furnace]

A heat treatment furnace of the present invention is configured to perform heat treatment on a metal tube or pipe, the metal tube or pipe being accommodated in the heat treatment furnace in a state where it is laid down on a plurality of cross beams, the plurality of cross beams being arranged along a longitudinal direction of the metal tube or pipe such that the distance between adjacent cross beams is in a range of 200 to 2500 mm. For the configuration of the heat treatment furnace of the present invention, a cart as shown in FIG. 1, for example, may be employed, in which the distance between adjacent cross beams may be set to be in the range of 200 to 2500 mm so that the metal tube or pipe can be accommodated in a state where it is laid down on a plurality of cross beams that are arranged along a longitudinal direction of the metal tube or pipe. Such a heat treatment furnace of the present invention is capable of readily implementing the method for heat treating a metal tube or pipe of the present invention as described above, and is capable of inhibiting bending and scratches without causing discoloration of the treated metal tube or pipe. Furthermore, the method does not use a heat resistant fabric, and thus is capable of avoiding deterioration of the manufacturing efficiency due to requirements for a longer heating time.

In the heat treatment furnace of the present invention, while cross beams having a flat top surface as shown in FIG. 2 may be employed, it is preferred to use cross beams having a convex top surface as shown in FIG. 4 in order to further inhibit scratches.

The heat treatment furnace of the present invention may include spacers to be interposed between the cross beams and the metal tube or pipe that is laid down thereon. While spacers having a flat top surface may be employed, it is preferred to use spacers having a convex top surface as shown in FIG. 5 in order to further inhibit scratches. Furthermore, while the spacers may be fixed to the cross beams, it is preferred to arrange spacers that are movable in a longitudinal direction. With the use of such spacers, cleaning of the heat treatment furnace can be easily accomplished by detaching the spacers, and further, their replacement with new ones can be easily accomplished when they are broken. Thus, it is possible to enhance the maintainability of the heat treatment furnace.

EXAMPLES

A test was conducted in which metal tubes or pipes were produced with the second heat treatment using the method for heat treating a metal tube or pipe of the present invention and the heat treatment furnace of the same, and the advantageous effects of the present invention were validated.

[Test Method]

A tube or pipe was laid down on the cross beams 22 of the cart as shown in FIG. 1, and then the cart was accommodated in the heat treatment furnace. After the heat treatment furnace was evacuated, the furnace was heated to apply a heat treatment to the tube or pipe so that the metal tube or pipe was produced. The conditions of the tube or pipe used in the test are as follows.

Tube or Pipe: 19.05 mm in outside diameter; 1.067 mm in wall thickness; 20,000 mm in length, and Material: a Ni-based alloy of ASME SB-163 UNS N06690

(Nominal composition: 30 mass % Cr-60 mass % Ni-10 mass % Fe).

In this test, the following cases were tested: a case in which a metal tube or pipe is laid down on cross beams having a flat top surface as shown in FIG. 2; a case in which a metal tube or pipe is laid down on cross beams having a convex top surface as shown in FIG. 4; and a case in which a metal tube or pipe is laid down on cross beams with spacers interposed therebetween. In all cases, the width of the cross beams (the length of the cross beams along the longitudinal direction of the metal tube or pipe that is laid down thereon) was 35 mm. As the spacers, spacers having a flat top surface and spacers having a convex top surface as shown in FIG. 5 were used, and both types of spacers were arranged such that they were movable in a longitudinal direction of the tube or pipe. The material from which the cross beams and the spacers were made was the same as that for the tube or pipe, i.e. the material was a Ni-based alloy as described above.

As the tubes or pipes, straight tubes or pipes having the above size and U-shaped bent tubes or pipes were prepared. For the test of straight tubes or pipes, eleven straight tubes or pipes were laid down on the cross beams in a single tier. For the test of bent tubes or pipes, three bent tubes or pipes were laid down on the cross beams in a single tier. The heat treatment of the straight tubes or pipes was carried out in such a manner that: they were heated from room temperature to the heat treatment temperature of 725° C.; then the heat treatment temperature was maintained for 10 hours; and thereafter, they were cooled to room temperature over a period of 10 hours. For heat treatment of the bent tubes or pipes, the length of time for maintaining the heat treatment temperature was 2 hours, and the other test conditions than that were the same as those for the straight tubes or pipes.

[Evaluation Index]

Investigations were made to find the number of scratches and the amount of bending of the metal tubes or pipes produced by the treatment, and the results were evaluated. The investigations were made in the following manner. For the straight tubes or pipes, among the eleven tubes or pipes laid down in a single tier, the one in the middle position was used for the investigation, and for the bent tubes or pipes, among the three tubes or pipes laid down in a single tier, the one in the middle position was used for the investigation. For determination of the amount of bending, the amount of bending per 1000 mm was measured for the entire length of the metal tube or pipe and the maximum value thereof was defined as its amount of bending. For determination of the number of scratches, a standard limit sample having a depth of 10 μm and a length of 10 mm was prepared. The outer surface of the metal tubes or pipes was examined over the entire length of the tubes or pipes for the presence or absence of scratches formed therein having a depth and length equal to or exceeding those of the standard limit sample (a depth of 10 μm or more and a length of 10 mm or more), and the number of scratches having a depth and length equal to or exceeding those of the standard limit sample was counted.

In Table 1, the meanings of the reference symbols in the "evaluation" column in the section of the metal tube or pipe produced by the treatment are as follows:

◯: The symbol "◯" indicates that the amount of bending per 1000 mm is 0.5 mm or less and the number of scratches is 20 or less.

x: The symbol "x" indicates that one of the following conditions was not satisfied: the amount of bending per 1000 mm is 0.5 mm or less; and the number of scratches is 20 or less.

Table 1 shows: the classification; the shape of the tube or pipe; the distance d between adjacent cross beams (mm); the presence or absence of interposition of spacers; the radius of curvature of the top surface of the cross beams or spacers; and the results of investigations on the metal tubes or pipes produced by the treatment. The results of investigations on the produced metal tubes or pipes include: the amount of bending per 1000 mm; the number of scratches; and evaluations, of the metal tube or pipe produced by the treatment.

200 to 2500 mm, it is possible to inhibit bending and scratches in the metal tubes or pipes that are produced by the treatment without causing discoloration.

Among Inventive Examples 1 to 3, the distance between adjacent cross beams was constant at 500 mm while the top surface profile of the cross beams was varied. As a result, no significant difference was observed in the amount of bending in the metal tubes or pipes produced by the treatment; however, the number of scratches was reduced in Inventive Examples 2 and 3, in which cross beams having a convex top surface were used, as compared to Inventive Example 1, in which cross beams having a flat top surface were used.

TABLE 1

| | | Test Conditions | | | Produced Tube or pipe | | |
|---|---|---|---|---|---|---|---|
| Classification | Tube or pipe shape | Distance between adjacent cross beams (mm) | Interposition of spacers | Radius of curvature of top surface of cross beams or spacers (mm) | Amount of bending (mm) | Number of scratches | Evaluation |
| Inventive Ex. 1 | Straight | 500 | Absent | ∞ (flat) | 0.17 | 9 | ○ |
| Inventive Ex. 2 | Straight | 500 | Absent | 300 | 0.16 | 6 | ○ |
| Inventive Ex. 3 | Straight | 500 | Absent | 100 | 0.19 | 3 | ○ |
| Inventive Ex. 4 | Straight | 500 | Present | ∞ (flat) | 0.18 | 11 | ○ |
| Inventive Ex. 5 | Straight | 500 | Present | 300 | 0.21 | 8 | ○ |
| Inventive Ex. 6 | Straight | 500 | Present | 100 | 0.19 | 4 | ○ |
| Inventive Ex. 7 | Straight | 500 | Present | 50 | 0.16 | 6 | ○ |
| Inventive Ex. 8 | Straight | 200 | Present | 100 | 0.12 | 15 | ○ |
| Inventive Ex. 9 | Straight | 300 | Present | 100 | 0.15 | 7 | ○ |
| Inventive Ex. 10 | Straight | 1500 | Present | 100 | 0.27 | 3 | ○ |
| Inventive Ex. 11 | Straight | 2500 | Present | 100 | 0.45 | 3 | ○ |
| Inventive Ex. 12 | Bent | 200 | Absent | ∞ (flat) | 0.13 | 16 | ○ |
| Inventive Ex. 13 | Bent | 500 | Absent | ∞ (flat) | 0.18 | 12 | ○ |
| Inventive Ex. 14 | Bent | 1500 | Absent | ∞ (flat) | 0.29 | 9 | ○ |
| Inventive Ex. 15 | Bent | 2500 | Absent | ∞ (flat) | 0.41 | 5 | ○ |
| Comparative Ex. 1 | Straight | 100 | Absent | ∞ (flat) | 0.08 | 25 | X |
| Comparative Ex. 2 | Straight | 3000 | Absent | ∞ (flat) | 0.98 | 5 | X |
| Comparative Ex. 3 | Straight | 100 | Present | 100 | 0.09 | 22 | X |
| Comparative Ex. 4 | Straight | 3000 | Present | 100 | 0.88 | 2 | X |

[Test Results]

The results shown in Table 1 demonstrate the following. In Inventive Examples 1 to 15, in which the distance between adjacent cross beams was set to be in the range of 200 to 2500 mm, all the metal tubes or pipes, produced by the treatment under the respective conditions, had an amount of bending of 0.5 mm or less while having 20 or less scratches, and thus the evaluations of all of them were ○. In contrast, in Comparative Examples 1 and 3, the distance between adjacent cross beams was set to 100 mm, which is outside the range specified by the present invention. Consequently, the metal tubes or pipes of both examples, produced by the treatment under the respective conditions, had more than 20 scratches, and thus the evaluations of both of them were x. Also, in Comparative Examples 2 and 4, the distance between adjacent cross beams was set to 3000 mm, which is outside the range specified by the present invention. Consequently, the metal tubes or pipes of both examples, produced by the treatment under the respective conditions, had an amount of bending of greater than 0.5 mm, and thus the evaluations of both of them were x.

Furthermore, the outer surface of the metal tubes or pipes produced by the treatment in Inventive Examples 1 to 15 was each examined for discoloration, and no discoloration was observed. These results demonstrate that: by setting the distance between adjacent cross beams to be in the range of These results demonstrate that the use of cross beams having a convex top surface further inhibits scratches.

Among Inventive Examples 4 to 7, in which the spacers were interposed between the tubes or pipes and the cross beams on which they were laid down, the distance between adjacent cross beams was constant at 500 mm while the top surface profile of the spacers was varied. As a result, no significant difference was observed in the amount of bending in the metal tubes or pipes produced by the treatment; however, the number of scratches was reduced in Inventive Examples 5 to 7, in which spacers having a convex top surface were used, as compared to Inventive Example 4, in which spacers having a flat top surface were used. These results demonstrate that the use of spacers having a convex top surface further inhibits scratches.

INDUSTRIAL APPLICABILITY

As described in the foregoing, the method for heat treating a metal tube or pipe of the present invention is capable of inhibiting bending and scratches of treated metal tubes or pipes. Thus, by applying the method for heat treating a metal tube or pipe of the present invention and the heat treatment furnace for use therein to the manufacturing of metal tubes or pipes, it is possible to produce metal tubes or pipes having high corrosion resistance of the present invention. The produced metal tubes or pipes are suitable as metal tubes or pipes for use in nuclear power plants, and therefore, the present invention can be effectively utilized in the manufacture of metal tubes or pipes for use in nuclear power plants.

REFERENCE SIGNS LIST

1: metal tube or pipe,
1a: bottom portion of metal tube or pipe,
2: car
21: carriage,
22: cross beam
22a: vertex portion of convex top surface of cross beam,
23: support pillar,
24: spacer

What is claimed is:

1. A method for heat treating a metal tube or pipe, comprising:
   heat treating a metal tube or pipe which is accommodated in a heat treatment furnace, the metal tube or pipe being laid down on a plurality of cross beams, the plurality of cross beams being arranged along a longitudinal direction of the metal tube or pipe such that a distance between adjacent ones of the cross beams is in a range of 200 to 2500 mm, the metal tube or pipe being in contact with the cross beams, wherein
   as the cross beams, cross beams having a convex top surface are used, the convex top surface having a radius of curvature in a range of 50 to 300 mm.

2. A method for heat treating a metal tube or pipe comprising:
   heat treating a metal tube or pipe, which is accommodated in a heat treatment furnace, the metal tube or pipe being laid down on a plurality of the cross beams with spacers having a convex top surface interposed therebetween, the plurality of cross beams being arranged along a longitudinal direction of the metal tube or pipe such that a distance between adjacent ones of the cross beams is in a range of 200 to 2500 mm, the metal tube or pipe being in contact with the spacers, wherein
   the convex top surface has a radius of curvature in a range of 50 to 300 mm.

3. The method for heat treating a metal tube or pipe according to claim 1, wherein the metal tube or pipe has a composition consisting of, in mass %, C: 0.15% or less, Si: 1.00% or less, Mn: 2.0% or less, P: 0.030% or less, S: 0.030% or less, Cr: 10.0% to 40.0%, Ni: 8.0% to 80.0%, Ti: 0.5% or less, Cu: 0.6% or less, Al: 0.5% or less, and N: 0.20% or less, the balance being Fe and impurities.

4. A heat treatment furnace that performs heat treatment on a metal tube or pipe, the metal tube or pipe being accommodated in the heat treatment furnace in a state where the metal tube or pipe is laid down on a plurality of cross beams, the plurality of cross beams being arranged along a longitudinal direction of the metal tube or pipe such that a distance between adjacent ones of the cross beams is in a range of 200 to 2500 mm, the metal tube or pipe being in contact with the cross beams wherein
   as the cross beams, cross beams having a convex top surface are used, the convex top surface having a radius of curvature in a range of 50 to 300 mm.

5. A heat treatment furnace, that performs heat treatment on a metal tube or pipe, the metal tube or pipe being accommodated in a heat treatment furnace in a state where the metal tube or pipe is laid down on a plurality of cross beams with spacers having a convex top surface interposed therebetween, the plurality of cross beams being arranged along a longitudinal direction of the metal tube or pipe such that a distance between adjacent ones of the cross beams is in a range of 200 to 2500 mm, the metal tube or pipe being in contact with the spacers, wherein
   the convex top surface has a radius of curvature in a range of 50 to 300 mm.

6. The method for heat treating a metal tube or pipe according to claim 2, wherein the metal tube or pipe has a composition consisting of, in mass %, C: 0.15% or less, Si: 1.00% or less, Mn: 2.0% or less, P: 0.030% or less, S: 0.030% or less, Cr: 10.0% to 40.0%, Ni: 8.0% to 80.0%, Ti: 0.5% or less, Cu: 0.6% or less, Al: 0.5% or less, and N: 0.20% or less, the balance being Fe and impurities.

* * * * *